Aug. 1, 1944.　　　K. C. CLARK　　　2,354,944

SINGLE TRACK AUXILIARY WHEEL AND TIRE CARRIER

Filed Jan. 26, 1942

INVENTOR.
KENNETH C. CLARK
BY Munn, Liddy, Gloccum & Kane
ATTORNEYS

Patented Aug. 1, 1944

2,354,944

UNITED STATES PATENT OFFICE 2,354,944

SINGLE TRACK AUXILIARY WHEEL AND TIRE CARRIER

Kenneth C. Clark, Watsonville, Calif.

Application January 26, 1942, Serial No. 428,168

10 Claims. (Cl. 224—29)

The present invention relates to improvements in a single track auxiliary wheel and tire carrier, and it consists of the combinations, constructions and arrangements hereinafter described and claimed.

An object of my invention is to provide a single track auxiliary wheel and tire carrier that normally supports an auxiliary wheel and tire under the vehicle body and that will guide the wheel and tire from a position under the body into one along the side of the vehicle with the tire of the wheel brought into contact with the road. The device permits a heavy tire to be readily moved under a vehicle body with little effort and to be removed when needed. In the present invention, the wheel and tire are suspended under the single track when the device is in normal position.

In my copending application on a double track auxiliary wheel and tire carrier, serial number 422,073, filed December 8, 1941, the wheel and tire are supported above the double track when the device is in normal position rather than under the track. Also in the copending case the wheel and tire are moved transversely from a position under the vehicle body to the side of the body where the device will upend the wheel for bringing the tire into contact with the ground without moving the wheel along the side of the vehicle body. Little effort is required to move the wheel along the track even though the wheel and tire are heavy. In the present invention the device moves the tire to the side of the vehicle body and then along the side of the body, the latter movement also swinging the wheel from a horizontal plane into substantially a vertical plane with the tire finally being brought to rest on the ground.

In an earlier copending application on an auxiliary wheel and tire carrier, Serial Number 416,507, filed October 25, 1941, I show an arm pivotally mounted under a vehicle body and swingable in a horizontal plane for moving an auxiliary wheel and tire from a position under the body into one alongside of the body. The arm carries a platform on which the wheel is mounted and the platform is tiltable for bringing the tire of the auxiliary wheel into contact with the ground. No lifting of the wheel is necessary when moving the wheel under the vehicle body and very little effort is required for swinging the wheel and platform into a horizontal position from a vertical position where the tire rests on the ground.

A further object of my invention is to provide a device of the type described which is extremely simple in construction and which can be attached to a vehicle without any alterations being necessary in the latter.

Other objects and advantages will appear in the following specification, and the novel features of the device will be particularly pointed out in the appended claims.

My invention is illustrated in the accompanying drawing forming a part of this application, in which.

While I have shown only the preferred form of my invention, it should be understood that various changes or modifications may be made within the scope of the appended claims without departing from the spirit of the invention.

I will first describe the track and then the carriage construction.

Single track

Figure 1:
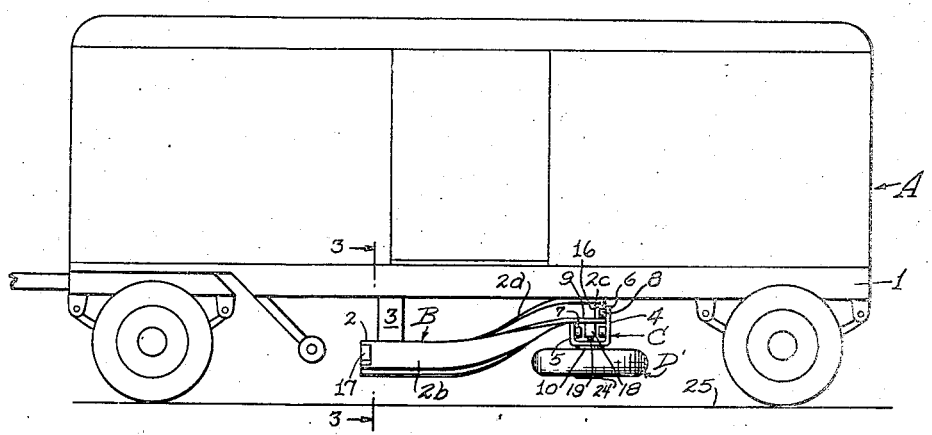
Figure 1 is a side elevation of a vehicle body showing my device operatively applied thereto.
Figure 4:
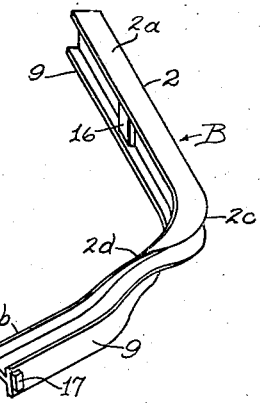
Figure 4 is a perspective view of the track.
Figure 3:
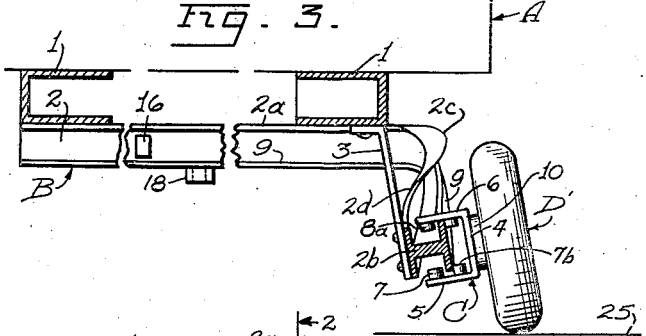
Figure 3 is a section taken substantially along the line 3—3 of Figure 1 showing the carriage at the outer end of the track.

In carrying out my invention I make use of a vehicle, indicated generally at A, and the vehicle may be a truck, a trailer, a semi-trailer, etc. The body A of the vehicle has channels I to which the single track, indicated generally at B, is secured. Figure 4 shows the track B as comprising an I-beam 2 which is curved and twisted in the particular manner illustrated in the figure. The I-beam has one leg 2a that extends under the chassis and transverse to the vehicle, and this leg will be termed the inner end of the track. The I-beam has a second leg 2b that extends substantially at right angles to the first leg, and I will term this the outer end of the track. A curved portion 2c merges the leg 2a into the leg 2b. The leg 2b has a twisted portion 2d that extends through an arc of substantially 90°. The leg 2a or inner end of the track extends between the channels I of the chassis and is secured thereto by welding, riveting, or other suitable fastening means; while the leg 2b or outer end of the track extends substantially parallel with one side of the vehicle body as shown in Figures 1 and 3. It is the outer end of the track 2b which has the substantially 90° twist therein and indicated at 2d for a purpose presently to be described. The leg 2b is connected to the channels 1 by a bracket 3. I will now describe the carriage that supports the auxiliary wheel and tire.

Auxiliary wheel and tire supporting carriage

Figure 2:
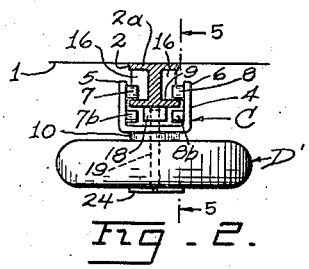
Figure 2 is a section taken substantially along the line 2—2 of Figure 5.
Figure 5:
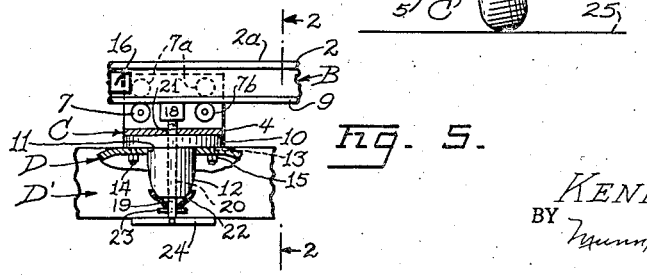
Figure 5 is a section taken substantially along the line 5—5 of Figure 2.

On the track B, I mount a carriage, indicated generally at C. The carriage is shown in detail in Figures 2 and 5, and it comprises a U-shaped frame 4. The sides 5 and 6 of the frame straddle the I-beam 2, as shown in Figure 2, and each frame side carries four rollers divided into upper and lower pairs. The four rollers mounted on the side 5 are indicated generally at 7, and the four rollers mounted on the side 6 are indicated generally at 8. Figure 5 illustrates the four rollers 7, and the upper pair of rollers designated at 7a ride on the flange or base 9 of the I-beam 2. The lower set of rollers designated at 7b bear against the underside of the flange 9 with sufficient play between the two pairs of rollers to permit the carriage C to move along the track and to take the turn 2c and the twist 2d without any binding action. The other side of the carriage, indicated at 6, has an upper pair of rollers designated at 8a and a lower pair of rollers designated at 8b. The groups of rollers support the carriage on the track and permit it to move along the flange 9. The frame sides 5 and 6 hold the carriage against lateral movement with respect to the track while the carriage moves along the track.

It will be noted from Figure 5 that the carriage C has a platform 10 mounted thereon to which the auxiliary wheel D is removably secured. The wheel has a central opening 11 for receiving a center guide 12 carried by the platform 10. The wheel also has openings 13 for receiving studs 14 carried by the platform 10. Nuts 15 are screwed onto the studs and secure the wheel to the platform. The wheel carries a tire D'.

The I-beam has stops 16 and 17 for limiting the movement of the carriage C along the track. The pair of stops 16 are contacted by the carriage when it reaches the midpoint between the channels 1 of the vehicle chassis. When this position is reached the center of the carriage will be in alignment with the axis of a locking nut 18 that is carried by the underside of the I-beam. A clamping bolt 19 is passed through aligned openings 20 and 21 in the central guide 12 and the platform 10 and in the base of the carriage frame 4. The bolt has a threaded end which is screwed into the nut 18, and the bolt carries a ferrule 22 that contacts with the top of the central guide 12 and forces the carriage C into clamping relation with the I-beam. A pin 23 is carried by the bolt and bears against the ferrule. The bolt has a handle 24 by means of which it is turned and the pin 23 rotates on the ferrule when the bolt is screwed into the nut 18. The handle 24 is small enough to pass down inside the tire if necessary.

Operation

From the foregoing description of the various parts of the device, the operation thereof may be readily understood.

I will now describe how the carriage when moving along the track will be guided from a position under the vehicle to a position alongside the vehicle, and I will further show how the carriage is rotated for swinging the wheel and tire from a horizontal into substantially a vertical position where the tire will come to rest on the ground. The flange 9 has a curved portion corresponding to the curve 2c and therefore when the carriage reaches the curved portion 2c it will be turned in its direction of travel at approximately a right angle for causing the carriage to move along the side of the vehicle. After the carriage has made its right angle turn, it will reach the twisted portion 2d in the track. The substantially 90° twist in the track will bring the flange 9 from a position at the bottom of the track into a position along one side of the track, see Figure 4. The twist will cause the carriage to swing through an arc of substantially 90° about a substantially horizontal line. This swinging of the carriage will move the wheel and tire D' into practically a vertical position, as shown in Figure 3. The leg 2b is inclined downwardly at a slight angle so as to bring the tire D' into contact with the ground 25, as illustrated in Figures 1 and 3.

In securing an auxiliary wheel to the carriage C, the carriage is first moved to the outer end of the leg 2b until it bears against the stop 17. The auxiliary wheel is now rolled up so that its central opening is an alignment with the central guide 12 whereupon the wheel may be rocked against the platform 10, the guide 12 causing the wheel to take its proper place on the platform. The platform is inclined slightly from the vertical to permit ease of assembly. Should the openings 13 be slightly out of registration with the studs 14, the wheel may be rolled a slight distance until registry occurs, whereupon the wheel can be moved against the platform 10. Nuts 15 are now tightened on the studs and secure the wheel to the platform. The wheel is ready for movement into a position under the vehicle body by moving the carriage along the I-beam. The end 2b extends at a slight angle with respect to the ground 25 so that the wheel will be lifted immediately above the ground and then can be moved along the I-beam. The wheel will have a tendency to swing from its vertical position into a horizontal position due to its weight, and I make use of this tendency for elevating the carriage C as it is moved along the twisted portion 2d of the I-beam. Due to this particular feature it requires little effort to raise the wheel and cause the carriage to ride up to the curved portion 2c of the I-beam. The curved portion will guide the carriage on to the inner end of leg 2a of the I-beam, and the movement along the leg 2a is easy because the carriage is moving in a horizontal plane. When the carriage strikes the stops 16, the openings 20 and 21 will align with the threaded bore in the nut 18. The bolt 19 can be passed through the aligned openings and screwed into the nut in the manner shown in Figure 5. The carriage C is clamped to the I-beam by the bolt and will not rattle.

When it is desired to remove the auxiliary wheel and tire from the carriage, the reverse movement takes place. The bolt 19 is first freed from the nut 18 and then removed from the guide 12. The carriage C is now manually moved to the side of the vehicle body, and upon reaching the side of the vehicle is turned at right angles by the curved portion 2c. Further movement of the carriage will bring it into the twisted portion 2d of the I-beam and this portion will rock or swing the carriage through substantially a 90° arc. The wheel and tire will therefore be swung from a horizontal position into a substantially vertical one. The movement of the carriage through the twisted portion is such that the wheel and carriage will revolve about a substantially horizontal line and this will make the moving easier to accomplish.

After the carriage passes the twisted portion 2d it enters the leg 2b and moves toward the outer end of the I-beam. The leg 2b is inclined downwardly at a slight angle and this will gently lower the wheel until the tire comes to rest on the ground 25. The web 9 is inclined slightly from the vertical and this will cause the tire to lean in the manner shown in Figure 3. At this point the wheel and tire may be removed from the platform 10 by freeing the nuts 15 and removing the wheel from the studs. The wheel is in a rolled position with the tire resting on the ground and therefore the wheel may be readily moved to the desired place without the necessity of lifting it. Auxiliary wheels on trucks weigh as much as two hundred and seventy pounds and sometimes more, and therefore a device which will support the weight of the wheel and tire while permitting it to be moved into an out-of-way position under the vehicle is a structure that offers a decided advantage to the truck operator in making his work easier when changing a tire.

I claim:

1. An auxiliary wheel and tire carrier for a vehicle and comprising a single rail having a portion extending transversely under the vehicle body and another portion extending at an angle to the first portion and paralleling the vehicle side, both portions being connected by a curve and a carriage movable along the rail for conveying an auxiliary wheel and tire from a position under the vehicle into one along side the vehicle side where the wheel and tire may be readily reached for removal from the carriage.

2. An auxiliary wheel and tire carrier for a vehicle and comprising a single rail having a portion extending transversely under the vehicle body and another portion extending at an angle to the first portion and paralleling the vehicle side, both portions being connected by a curve, and a carriage movable along the rail for conveying an auxiliary wheel and tire from a position under the vehicle into one paralleling the vehicle side, said carriage having the auxiliary wheel and tire depending therefrom when the carriage is disposed on the rail portion extending under the vehicle, the rail portion extending along the vehicle side having a 90° twist therein for swinging the carriage when it reaches this portion into a position to bring the tire into contact with the ground.

3. The combination with a vehicle, of a carriage for supporting an auxiliary wheel and tire, and an L-shaped track having one leg extending under the vehicle and the other leg extending alongside the vehicle with a short curve connecting both legs, said carriage being movable along the track and supporting the wheel and tire from the underside of the track when the carriage is positioned on the leg extending under the vehicle, the other leg having a 90° twist therein for swinging the carriage through an arc of 90° when the carriage is moved therealong, whereby the wheel and tire will be swung into a substantially vertical plane, the outer end of the last mentioned leg being spaced above the ground a distance where the tire will contact with the ground when the carriage reaches this point.

4. The combination with a vehicle, of a single rail carried thereby and having a portion extending under the vehicle and a portion being connected to the first portion by a curve and being bent at right angles and extending along one side of the vehicle, the last named track portion having a substantially 90° twist therein, and a carriage movable along the track and moving along the underside of the track portion disposed under the vehicle and moving along the side of the track after passing the 90° twist portion thereof, the twisting of the carriage swinging the wheel into a position where the tire will be brought adjacent to the ground.

5. In an auxiliary wheel and tire carrier, a track having a web for supporting and guiding a carriage, the web having a horizontal portion adapted to extend under a vehicle body, a curved and then a twisted portion leading from the horizontal portion, the web terminating in an end that extends along the side of the vehicle body, an auxiliary wheel and tire supporting carriage having sides straddling the web, and rollers supported by the sides and riding on the web, the wheel and tire depending from the carriage when the carriage is on the horizontal portion of the web, the twisted portion of the web swinging the carriage when it is moved thereby through an arc of about 90° so as to move the wheel where its tire will be disposed adjacent to the ground, the end of the web extending at an angle toward the ground for lowering the tire into contact with the ground when the carriage is moved along the web end.

6. In an auxiliary wheel and tire carrier, a track having a web for supporting and guiding a carriage, the web having a horizontal portion adapted to extend under a vehicle body, a curved and then a twisted portion leading from the horizontal portion, the web terminating in an end that extends along the side of the vehicle body, an auxiliary wheel and tire supporting carriage having sides straddling the web, rollers supported by the sides and riding on the web, the wheel and tire depending from the carriage when the carriage is on the horizontal portion of the web, the twisted portion of the web swinging the carriage when it is moved thereby through an arc of about 90° so as to move the wheel where its tire will be disposed adjacent to the ground, the end of the web extending at an angle toward the ground for lowering the tire into contact with the ground when the carriage is moved along the web end, and means for removably securing the wheel and tire to the carriage.

7. In an auxiliary wheel and tire carrier, a track having a portion extending transversely under a vehicle body and a portion extending along the side of the body and connected to the first portion by a short curve of substantially 90°, a carriage movable along the track, a stop disposed at each end of the track for limiting the movement of the carriage, means for removably securing an auxiliary wheel and tire to the carriage, said carriage supporting the wheel in a horizontal position when the carriage is in the transverse track portion, and means for securing the carriage from movement when the carriage is disposed on the track portion underlying the vehicle body, said last-named means tightening the carriage to the track to prevent rattling, said carriage being adapted to convey an auxiliary wheel and tire from a position under the vehicle into one along side the vehicle where the wheel and tire may be readily reached for removal from the carriage, the track portion extending along the body having a 90° twist therein for causing the carriage to swing the wheel and tire into a vertical position when the carriage is moved past the twist.

8. In an auxiliary wheel and tire carrier, an I-beam track having a base, a nut fixed to the base, a carriage movable along the track and having pairs of rollers disposed on each side of the I-beam web and riding on both surfaces of the base, a clamping bolt on the carriage and being threadable into the nut for preventing movement of the carriage along the I-beam and for clamping the carriage to the I-beam for preventing rattling between the carriage rollers and the I-beam when the clamping bolt is tightened in place.

9. In an auxiliary wheel and tire carrier, an I-beam track formed in substantially the shape of an L with a curved portion connecting the two legs of the L, one leg having a substantially 90° twist therein, and a wheel and tire supporting carriage movable along the track, said carriage when on the non-twisted portion of the track supporting the wheel and tire in a horizontal plane, said carriage when moved onto the twisted track portion from the untwisted portion, being rotated through substantially a 90° arc for swinging the wheel and tire into substantially a vertical plane.

10. In an auxiliary wheel and tire carrier, an I-beam track formed in substantially the shape of an L with a curved portion connecting the two legs of the L, one leg having a substantially 90° twist therein, and a wheel and tire supporting carriage movable along the track, said carriage when on the non-twisted portion of the track supporting the wheel and tire in a horizontal plane, said carriage when moved onto the twisted track portion from the untwisted portion, being rotated through substantially a 90° arc for swinging the wheel and tire into substantially a vertical plane and stops disposed at the ends of the track for limiting the movement of the carriage.

KENNETH C. CLARK.